(12) United States Patent
Satoh

(10) Patent No.: US 7,090,642 B2
(45) Date of Patent: Aug. 15, 2006

(54) ULTRASONIC TRANSMITTING AND RECEIVING APPARATUS AND ULTRASONIC TRANSMITTING AND RECEIVING METHOD

(75) Inventor: Yoshiaki Satoh, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 150 days.

(21) Appl. No.: 10/670,964

(22) Filed: Sep. 26, 2003

(65) Prior Publication Data

US 2004/0122316 A1 Jun. 24, 2004

(30) Foreign Application Priority Data

Sep. 30, 2002 (JP) .............................. 2002-284999
Aug. 13, 2003 (JP) .............................. 2003-207495

(51) Int. Cl.
  *A61B 8/00* (2006.01)
(52) U.S. Cl. ................................... 600/447
(58) Field of Classification Search ............... 600/443, 600/447, 454–456; 128/916; 73/625–626; 367/103–105
See application file for complete search history.

(56) References Cited

U.S. PATENT DOCUMENTS

| | | | | |
|---|---|---|---|---|
| 5,278,757 | A | * | 1/1994 | Hoctor et al. ............... 600/459 |
| 5,537,367 | A | * | 7/1996 | Lockwood et al. .......... 367/87 |
| 5,673,699 | A | * | 10/1997 | Trahey et al. ............... 600/447 |
| 5,911,692 | A | * | 6/1999 | Hussain et al. ............. 600/447 |
| 6,014,897 | A | * | 1/2000 | Mo ............................ 73/628 |
| 6,120,449 | A | * | 9/2000 | Snyder et al. .............. 600/447 |
| 6,241,675 | B1 | | 6/2001 | Smith et al. |
| 6,279,399 | B1 | * | 8/2001 | Holm ......................... 73/626 |
| 6,527,723 | B1 | * | 3/2003 | Ossmann et al. ........... 600/459 |
| 6,635,018 | B1 | * | 10/2003 | Kawagishi et al. ......... 600/447 |
| 6,682,483 | B1 | * | 1/2004 | Abend et al. ............... 600/437 |
| 6,783,497 | B1 | * | 8/2004 | Grenon et al. ............. 600/459 |

OTHER PUBLICATIONS

Richard E. Davidsen, et al. "Two-Dimensional Random Arrays for Real Time Volumetric" Ultrasonic Imaging 16, pp. 143-163 (1994).

* cited by examiner

*Primary Examiner*—Francis J. Jaworski
(74) *Attorney, Agent, or Firm*—Sughrue Mion, PLLC

(57) ABSTRACT

An ultrasonic transmitting and receiving apparatus which is capable of reducing generation of side lobes, and thereby, obtaining images of satisfactory quality even when performing sector scan of an area having a wide range. The ultrasonic transmitting and receiving apparatus includes an ultrasonic probe having plural ultrasonic transducers, plural transmitting circuits for respectively generating plural drive signals to be supplied to the ultrasonic probe so as to transmit an ultrasonic beam, plural receiving circuits for respectively processing plural detection signals output from the ultrasonic probe which has received an ultrasonic echo, switching unit for selectively connecting a predetermined number of ultrasonic transducers in the plural ultrasonic transducers to the plural transmitting circuits and/or the plural receiving circuits, and control unit for controlling the switching unit to change a sparse pattern of the ultrasonic transducers which transmit and/or receive ultrasonic waves.

5 Claims, 9 Drawing Sheets

SPARSE PATTERN 1

SPARSE PATTERN 2

SPARSE PATTERN 2

FIG.8

TABLE FOR STEERING AREA 1

| (0, 1) | (Tx2, Rx3) | ...... |
|---|---|---|
| (1, 4) | (Tx3, Rx4) | ...... |

TABLE FOR STEERING AREA 2

| (0, 2) | (Tx1, Rx1) | ...... |
|---|---|---|
| (0, 3) | (Tx3, Rx5) | ...... |

⋮

TABLE FOR STEERING AREA 5

| ⋮ | ⋮ | ...... |
|---|---|---|
| ⋮ | ⋮ | ...... |

…

ULTRASONIC TRANSMITTING AND RECEIVING APPARATUS AND ULTRASONIC TRANSMITTING AND RECEIVING METHOD

BACKGROUND OF THE INVENTION

1. Field of the Invention

The present invention relates to an ultrasonic transmitting and receiving apparatus and an ultrasonic transmitting and receiving method to be used for observing internal organs in a living body and the like by transmitting and receiving ultrasonic waves.

2. Description of a Related Art

Conventionally, to obtain a three-dimensional image by transmitting and receiving ultrasonic waves, a one-dimensional sensor array with positional sensors has been used, and a two-dimensional image of a cross section in the depth direction is obtained by electrically steering the transmitting ultrasonic waves, and further, plural two-dimensional images obtained by mechanically shifting the one-dimensional sensor array are synthesized into a three-dimensional image. However, according to this technique, since there resides a time lag in the mechanical shift of the one-dimensional sensor array, plural two-dimensional images of different points of time are synthesized resulting in a blurred synthesized image. Accordingly, the technique is not suitable for imaging of objects having motion like a living body.

In order to eliminate the problem as described above, it is advantageous to obtain three-dimensional images by using a two-dimensional sensor array. However, since the number of ultrasonic detection elements included in the two-dimensional sensor array is extremely large compared to the one-dimensional sensor array, another problem arises. For example, when a two-dimensional sensor array of approximately 80×80 elements is used, it is ideal to receive ultrasonic waves by using all elements. However, when the number of the elements is large, such problem arises, that is, the wiring in manufacturing of the two-dimensional sensor array becomes complicated. Further, as to a number of channels of electrical circuits for processing detection signals obtained by detecting ultrasonic waves with the ultrasonic detection elements, since the same number of channels as a number of the ultrasonic detection elements are required, such another problem arises, that is, the electrical circuits become complicated.

Under such circumstances as described above, in order to reduce the number of channels of the electrical circuits for processing the detection signals, a "sparse array" is used, in which only partial ultrasonic detection elements in the two-dimensionally disposed plural ultrasonic detection elements are used.

For example, U.S. Pat. No. 6,241,675 B1 discloses, in an ultrasonic measurement system for measuring velocity of tissue, a sparse array in which transducers are selectively connected. Also, an arrangement of a sparse array adapted so as to obtain a satisfactory acoustic field by reducing side lobes is disclosed by Richard E. Davidsen et al. "TWO-DIMENSIONAL RANDOM ARRAYS FOR REAL TIME VOLUMETRIC IMAGING", ULTRASONIC IMAGING 16 (1994), (Academic Press Inc.), pp. 143–163.

However, when performing sector scan of a wide range of area, sometimes side lobes are generated in a specific direction. According to the above conventional art, the wiring connection, which has been once set up, is fixed and the arrangement thereof is hardly changed, and therefore, even when side lobes are generated in a specific direction, the side lobes can not be reduced. The side lobes lead to generation of an artifact (virtual image) or the like on the images obtained by ultrasonic imaging, which accelerates deterioration of the image and reduces the quality of image.

SUMMARY OF THE INVENTION

The present invention has been achieved in view of the above-described problems. An object of the present invention is to provide an ultrasonic transmitting and receiving apparatus and an ultrasonic transmitting and receiving method which are capable of reducing generation of side lobes in a specific direction, and thereby, obtaining images of satisfactory quality even when performing sector scan of an area having a wide range.

In order to solve the above-described problems, an ultrasonic transmitting and receiving apparatus according to one aspect of the present invention comprises: an ultrasonic probe including plural ultrasonic transducers; plural transmitting circuits for respectively generating plural drive signals to be supplied to the ultrasonic probe so as to transmit an ultrasonic beam; plural receiving circuits for respectively processing plural detection signals output from the ultrasonic probe which has received an ultrasonic echo; switching means for selectively connecting a predetermined number of ultrasonic transducers in the plural ultrasonic transducers to the plural transmitting circuits and/or the plural receiving circuits; and control means for controlling the switching means to change a sparse pattern of the ultrasonic transducers which transmit and/or receive ultrasonic waves.

Also, an ultrasonic transmitting and receiving method according to a first aspect of the present invention comprises the steps of: (a) selecting a predetermined number of ultrasonic transducers from among plural ultrasonic transducers included in an ultrasonic probe to determine a sparse pattern of the ultrasonic transducers which transmit and/or receive ultrasonic waves; and (b) transmitting an ultrasonic beam and/or receiving an ultrasonic echo by using the predetermined number of ultrasonic transducers selected at step (a).

Further, an ultrasonic transmitting and receiving method according to a second aspect of the present invention comprises the steps of: (a) changing a sparse pattern of ultrasonic transducers, which transmit and/or receive ultrasonic waves, in accordance with a steering range of an ultrasonic beam; and (b) transmitting an ultrasonic beam and/or receiving an ultrasonic echo in accordance with the sparse pattern changed at step (a).

According to the present invention, since the sparse pattern of the ultrasonic transducers, which transmit and/or receive ultrasonic waves, can be changed in accordance with the steering range of the ultrasonic beam to be transmitted, it is possible to reduce generation of side lobes in a specific direction, and thereby, to obtain images of satisfactory quality even when performing sector scan of an area having a wide range.

BRIEF DESCRIPTION OF THE DRAWINGS

FIG. 8 is a diagram showing an example of instruction tables which are stored in a flash memory.

DESCRIPTION OF THE PREFERRED EMBODIMENTS

Figure 1:
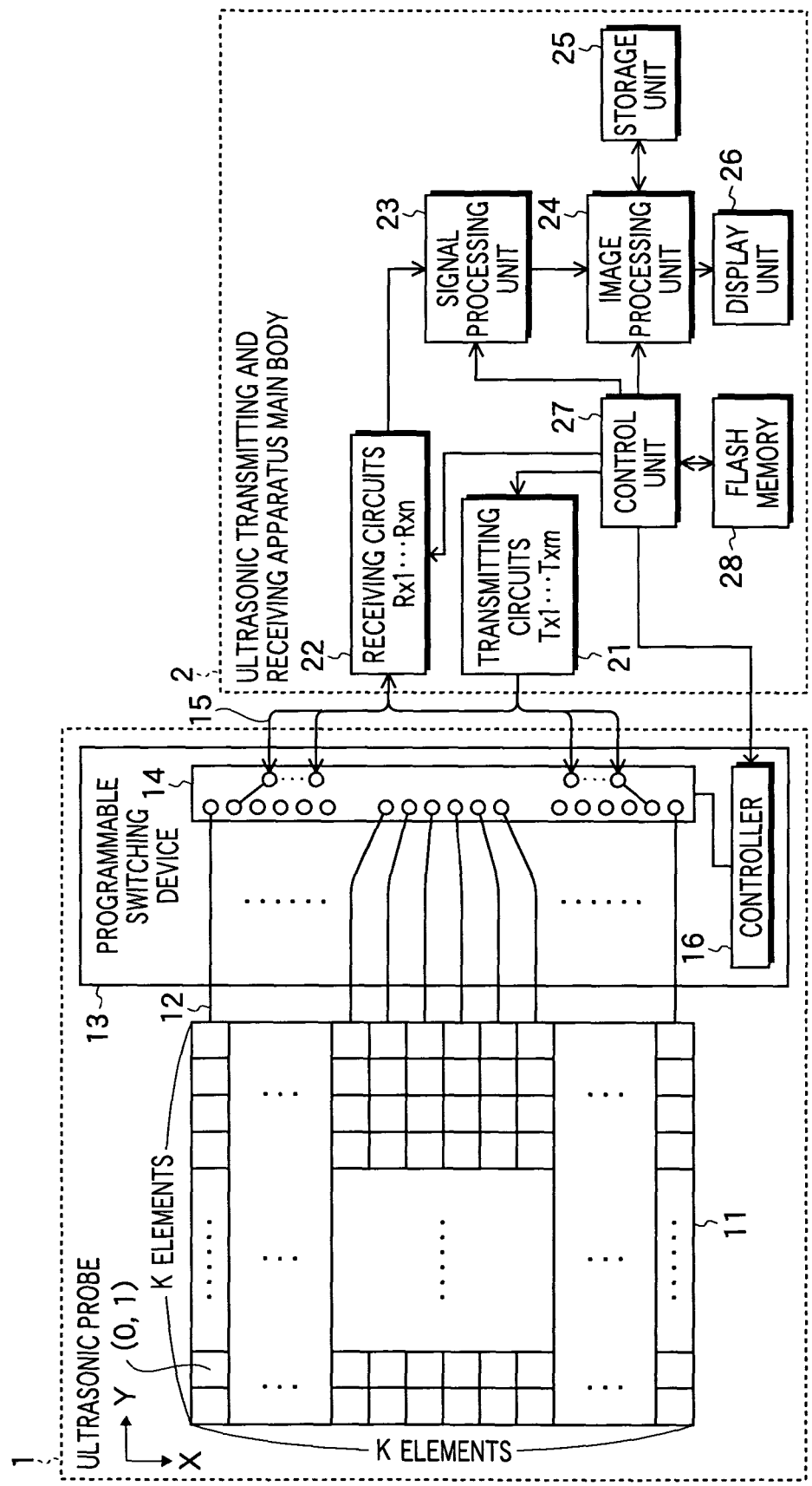
FIG. 1 is a block diagram showing a configuration of an ultrasonic transmitting and receiving apparatus according to one embodiment of the present invention.

Now, referring to the drawings, an embodiment of the present invention will be described.

FIG. 1 is a block diagram showing a configuration of an ultrasonic transmitting and receiving apparatus according to one embodiment of the present invention. As shown in FIG. 1, the ultrasonic transmitting and receiving apparatus comprises an ultrasonic probe 1, which is used being abutted on an object to be inspected, and an ultrasonic transmitting and receiving apparatus main body 2, which is connected to the ultrasonic probe 1.

The ultrasonic probe 1 has a transducer array 11 including $K^2$ ultrasonic transducers disposed into a two-dimensional matrix-like configuration, and a programmable switching device 13 that switches over the connection of partial ultrasonic transducers which are included in the $K^2$ ultrasonic transducers and actually transmit and receive the ultrasonic waves.

As for the ultrasonic transducer, for example, a piezoelectric element including a piezoelectric ceramic represented by PZT (Pb (lead) zirconate titanate) or a macromolecule piezoelectric element such as PVDF (polyvinylidene difluoride) is used.

The programmable switching device 13 has plural switching circuits (multiplexers) 14 and a controller 16 that controls these multiplexers 14. The multiplexers 14 are the circuits for switching over the connection between wirings 12 and wirings 15 connecting ultrasonic transducers, which are included in the $K^2$ ultrasonic transducers and actually transmit and receive ultrasonic waves, to the ultrasonic transmitting and receiving apparatus main body 2. For example, analogue switches, relay switches or the like may be used.

The ultrasonic transmitting and receiving apparatus main body 2 includes plural transmitting circuits 21, plural receiving circuits 22, a signal processing unit 23, an image processing unit 24, a storage unit 25, a display unit 26, a control unit 27 and a flash memory 28. The control unit 27 controls plural multiplexers 14 through the controller 16 to designate ultrasonic transducers that actually transmit and receive ultrasonic waves from among the $K^2$ ultrasonic transducers. The flash memory 28 stores arrangement information of the ultrasonic transducers that actually transmit and receive ultrasonic waves.

The ultrasonic transducers actually transmitting and receiving ultrasonic waves are connected to plural transmitting circuits 21 and plural receiving circuits 22 in the ultrasonic transmitting and receiving apparatus main body 2 via the programmable switching device 13. The plural transmitting circuits 21 respectively generates plural drive signals each having a predetermined delay time and supplies them to the ultrasonic probe 1 under the control of the control unit 27. Thereby, transmission beam forming is performed, and the ultrasonic probe 1 transmits an ultrasonic beam to a desired direction. The plural receiving circuits 22 respectively perform processing such as amplification and delay on the plural detection signals output from the ultrasonic probe 1 which has received an ultrasonic echo. The transmitting circuits 21 are provided with m channels from Tx1 to Txm, and the receiving circuits 22 are provided with n channels from Rx1 to Rxn. Here, both m and n are smaller than $K^2$.

The signal processing unit 23 performs addition of the detection signals output from plural receiving circuits 22, on which the delay processing has been made. Thereby, reception beam forming is performed. Also, the signal processing unit 23 generates image data on the basis of the added detection signals. The image processing unit 24 performs image processing while temporarily storing the image data output from the signal processing unit 23 in the storage unit 25. On the basis of an image signal output from the image processing unit 24, an ultrasonic image is displayed on the display unit 26.

Next, the relationship between sparse pattern of the ultrasonic transducers and acoustic field distribution in the two-dimensional transducer array will be described. Here, the term "sparse pattern of the ultrasonic transducers" means a pattern with respect to the density in arrangement of the ultrasonic transducers which are included in the plural ultrasonic transducers within the ultrasonic probe and actually transmit and/or receive ultrasonic waves. According to the embodiment, the density of the arrangement of the ultrasonic transducers, which actually transmit and/or receive ultrasonic waves, is changed in accordance with the transmission direction of the ultrasonic beam.

Figure 2:
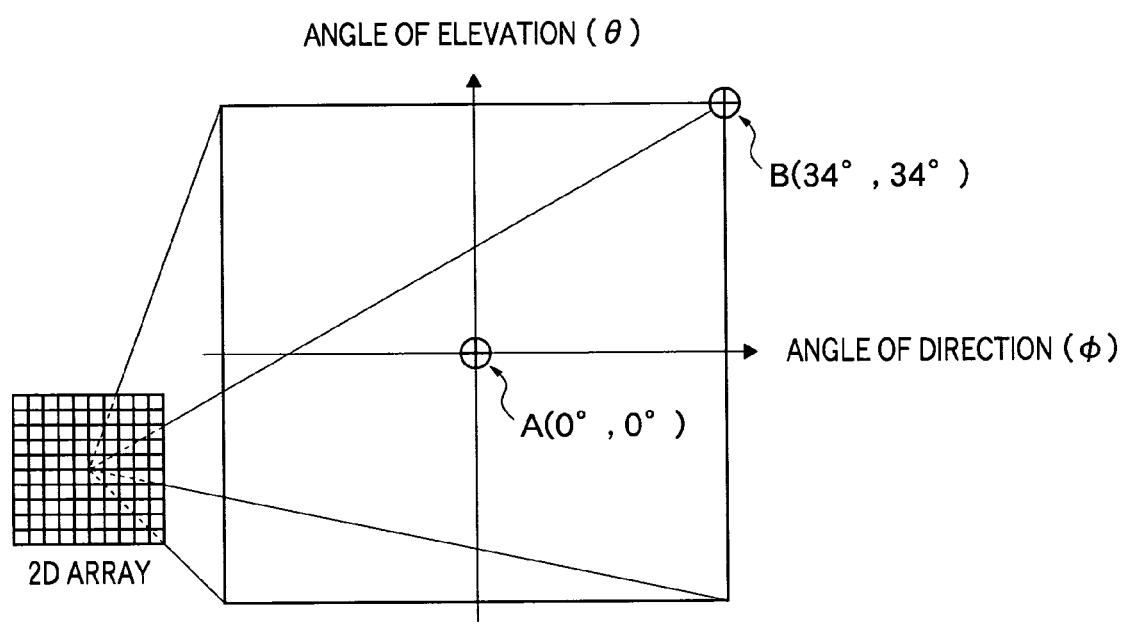
FIG. 2 is a diagram schematically showing a state in which an ultrasonic beam is transmitted from a two-dimensional transducer array to a point within a scan range.

FIG. 2 is a diagram schematically showing a state in which the ultrasonic beam is transmitted from the two-dimensional transducer array to a point within a scan range. Each of point A and point B is a focusing point within the space area which is subjected to sector scan by an ultrasonic beam. Here, when the position ($\phi$, $\theta$) of a point within the space area is expressed by using an angle of direction $\phi$ and an angle of elevation $\theta$, point A and point B are expressed as (0°, 0°) and (34°, 34°), respectively.

Figure 3A:
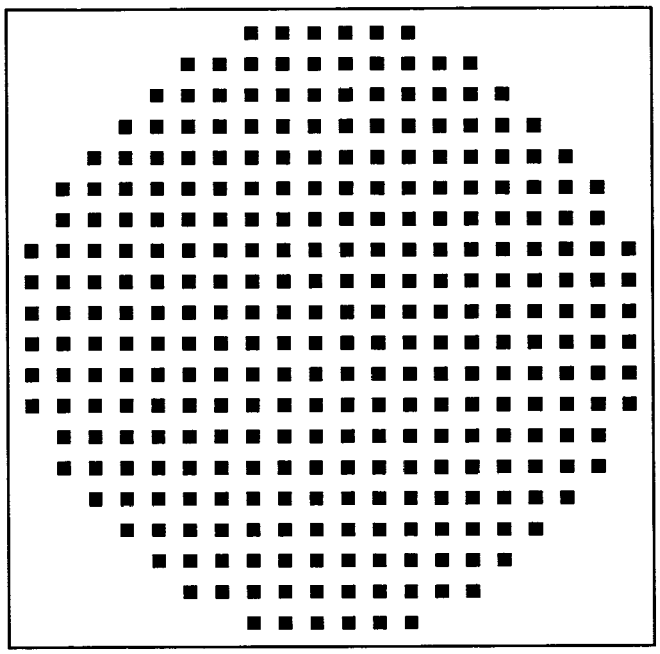
FIGS. 3A and 3B are diagrams showing sparse patterns of ultrasonic transducers which transmit and receive ultrasonic waves.
Figure 3B:
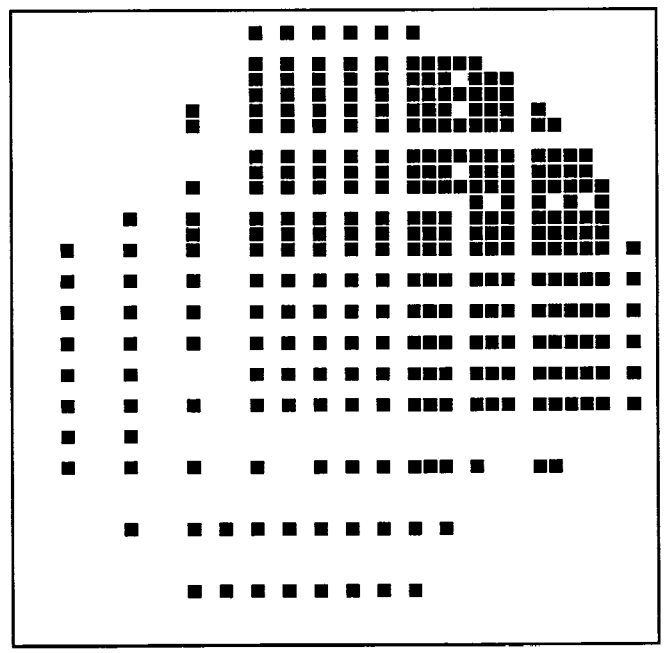
Figure 4:
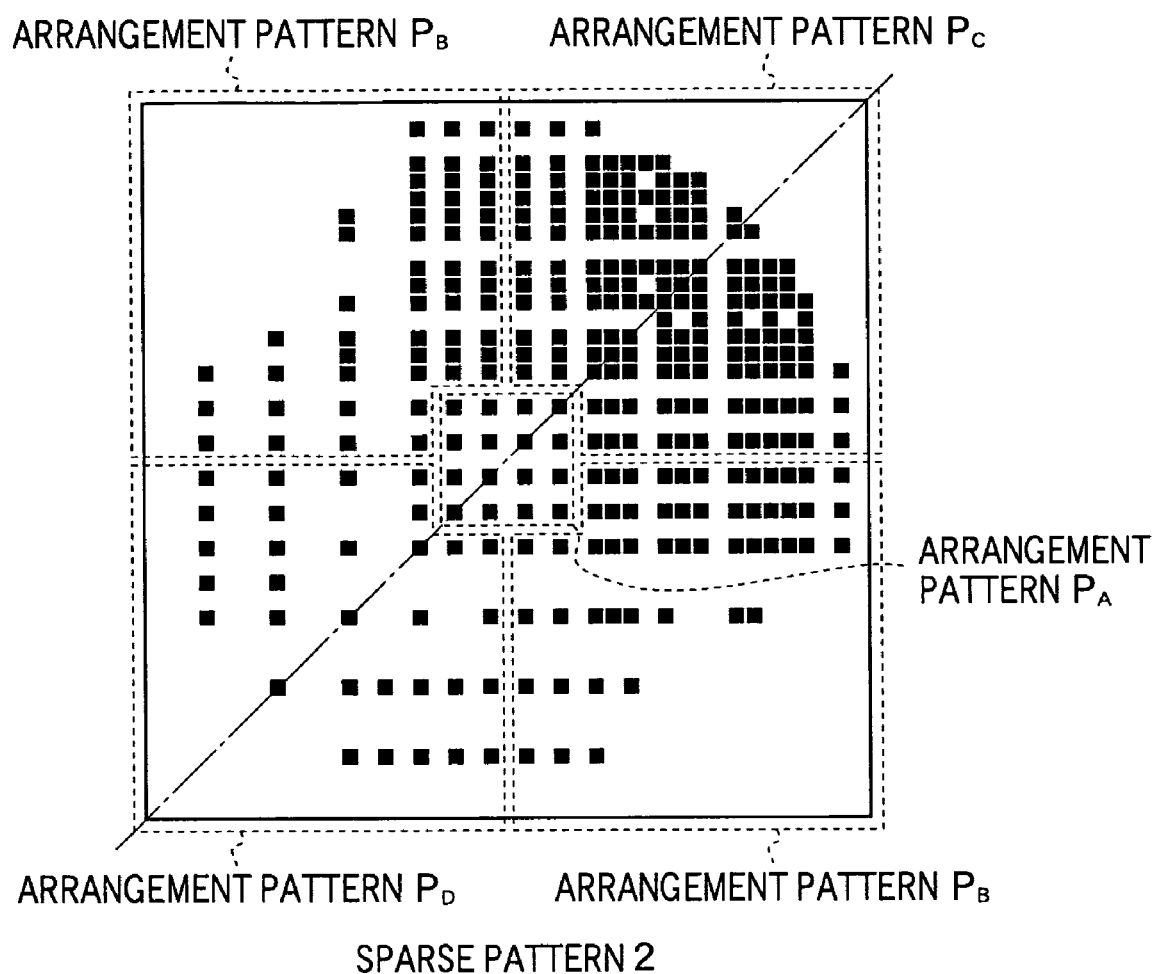
FIG. 4 is a diagram showing a sparse pattern of ultrasonic transducers which transmit and receive ultrasonic waves.

Also, FIGS. 3A, 3B and 4 are diagrams showing a sparse pattern, respectively, of the ultrasonic transducers, which transmit and receive ultrasonic waves. The ultrasonic transducers, which are disposed at the positions represented with black squares in these diagrams, are connected to the ultrasonic transmitting and receiving apparatus main body and used to actually transmit and receive ultrasonic waves.

FIG. 3A shows sparse pattern 1, and FIG. 3B shows sparse pattern 2. In the sparse pattern 1 and sparse pattern 2, the number of the ultrasonic transducers to be used is the same, but the positions of the ultrasonic transducers to be used are different form each other. In the sparse pattern 1, the used ultrasonic transducers are evenly disposed. In the sparse pattern 2, on the other hand, the used ultrasonic transducers are disposed so as to become more congested toward the right-upper direction in FIG. 3B. In the embodiment, the ultrasonic transducers are used for both transmission and reception.

FIGS. 5A and 5B, and FIGS. 6A and 6B respectively show the acoustic field distributions of the space area ($\phi$, $\theta$) in the case where the ultrasonic beam is transmitted and received while focusing the ultrasonic beam at the point A (FIG. 2) as a focal point, and in the case where the ultrasonic beam is transmitted and received while focusing the ultrasonic beam at the point B (FIG. 2) as a focal point, by using two different two-dimensional transducer arrays in which the ultrasonic transducers are disposed in accordance with the sparse pattern 1 and sparse pattern 2.

In FIGS. 5A–6B, the height direction represents the intensity of the ultrasonic wave, and two directions perpendicular to the height direction represent the angle of direction $\phi$ and the angle of elevation $\theta$, respectively. In these diagrams, main lobes 100, 110, 120 and 130 having the highest intensity and side lobes 101, 111, 121 and 131 generated thereabout are shown.

Figure 5A:
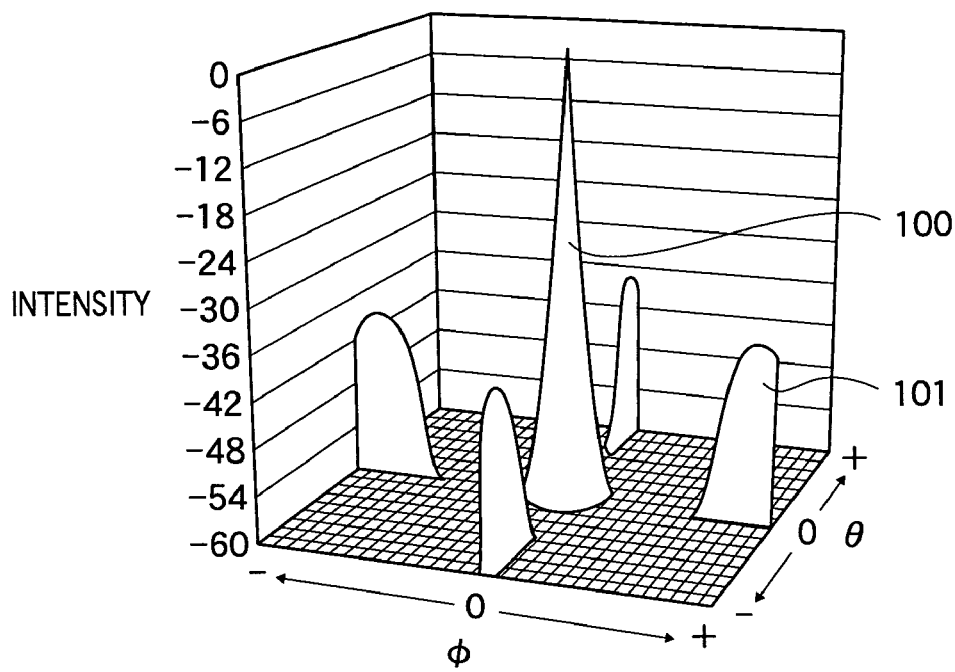
FIGS. 5A and 5B are diagrams showing acoustic field distributions when the ultrasonic beam is transmitted and received while focusing the ultrasonic beam at the point A shown in FIG. 2.
Figure 5B:
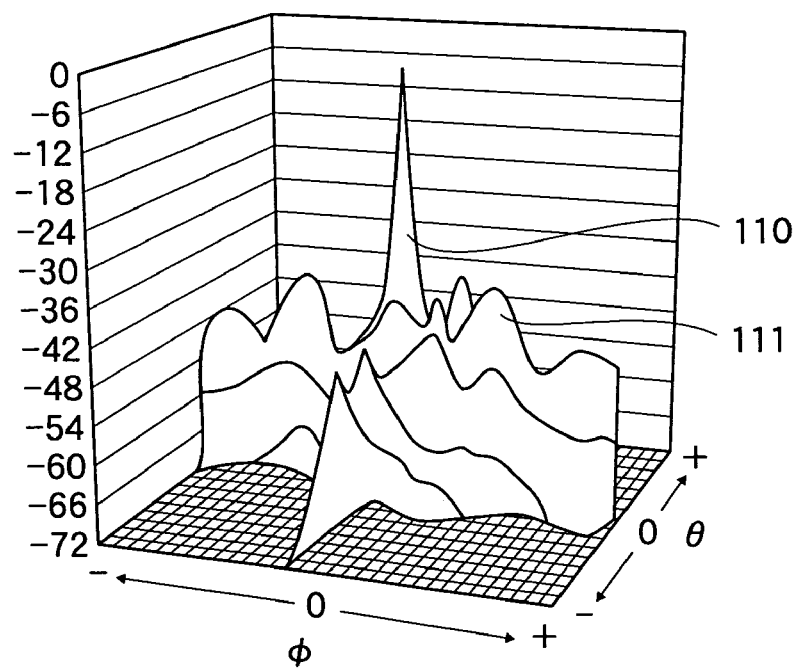

FIG. 5A shows the acoustic field distribution in the case where the ultrasonic beam is transmitted and received while focusing the ultrasonic beam at the point A as a focal point by using a two-dimensional transducer array having the sparse pattern 1. FIG. 5B shows the acoustic field distribution in the case where the ultrasonic beam is transmitted and received while focusing the ultrasonic beam at the point A as a focal point by using a two-dimensional transducer array having the sparse pattern 2.

Comparing FIGS. 5A and 5B, it can be seen that the intensity of the side lobes shown in FIG. 5A are smaller. Accordingly, it is understood that, when the point A is a focal point, it is advantageous to use a two-dimensional transducer array having the sparse pattern 1 with a smaller intensity of the side lobe.

Figure 6A:
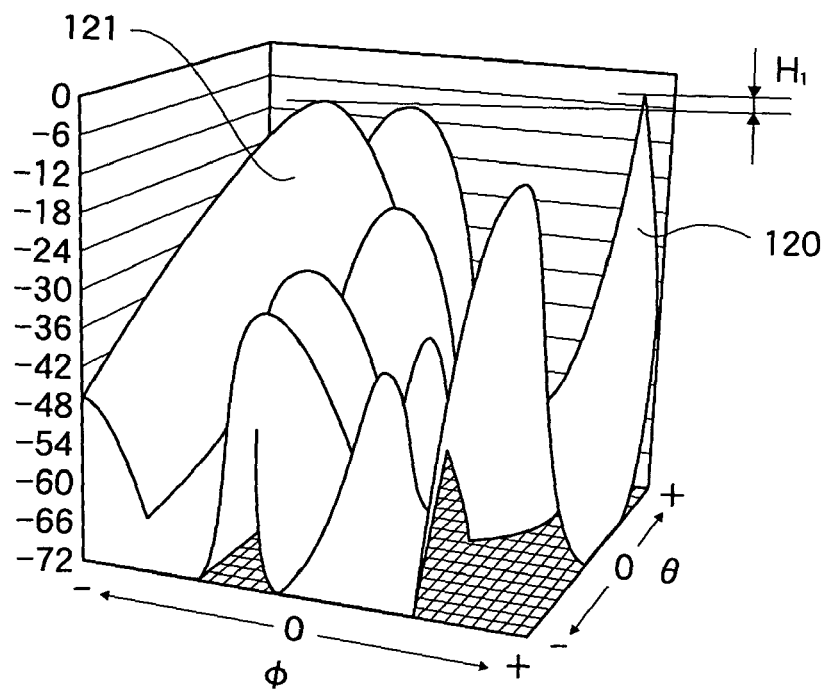
FIGS. 6A and 6B are diagrams showing acoustic field distributions when the ultrasonic beam is transmitted and received while focusing the ultrasonic beam at the point B shown in FIG. 2.
Figure 6B:
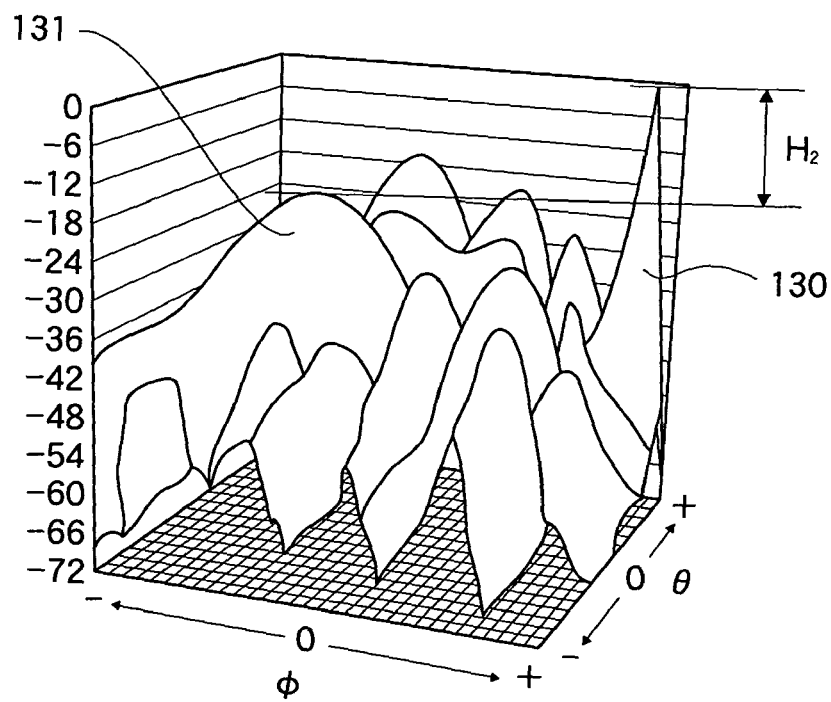

FIG. 6A shows the acoustic field distribution when the ultrasonic beam is transmitted and received while focusing the ultrasonic beam at the point B as a focal point by using a two-dimensional transducer array having the sparse pattern 1. FIG. 6B shows the acoustic field distribution when the ultrasonic beam is transmitted and received while focusing the ultrasonic beam at the point B as a focal point by using a two-dimensional transducer array having the sparse pattern 2.

Comparing FIGS. 6A and 6B, it can be seen that the height of the side lobes shown in FIG. 6B is lower, and that the difference H2 between the main lobe 130 and the side lobe 131 in FIG. 6B is larger than the difference H1 between the main lobe 120 and the side lobe 121 in FIG. 6A. Accordingly, it is understood that, when the point B is a focal point, it is advantageous to use a two-dimensional transducer array having the sparse pattern 2 with a smaller intensity of the side lobe.

From the above-described results, it has been found that the scan range should be divided into plural steering areas and the sparse pattern of the ultrasonic transducers to be used should be set for each of these steering areas. That is to say, the feature of the present invention is that the sparse pattern of the ultrasonic transducers, which transmit and/or receive ultrasonic waves, is set up in accordance with the steering direction (also simply referred to as "steering range" in the present invention) of the ultrasonic beam to be transmitted. Owing to this, it is possible to change the sparse pattern of the ultrasonic transducers in accordance with the steering range so as to reduce the generation of side lobes.

Figure 7:
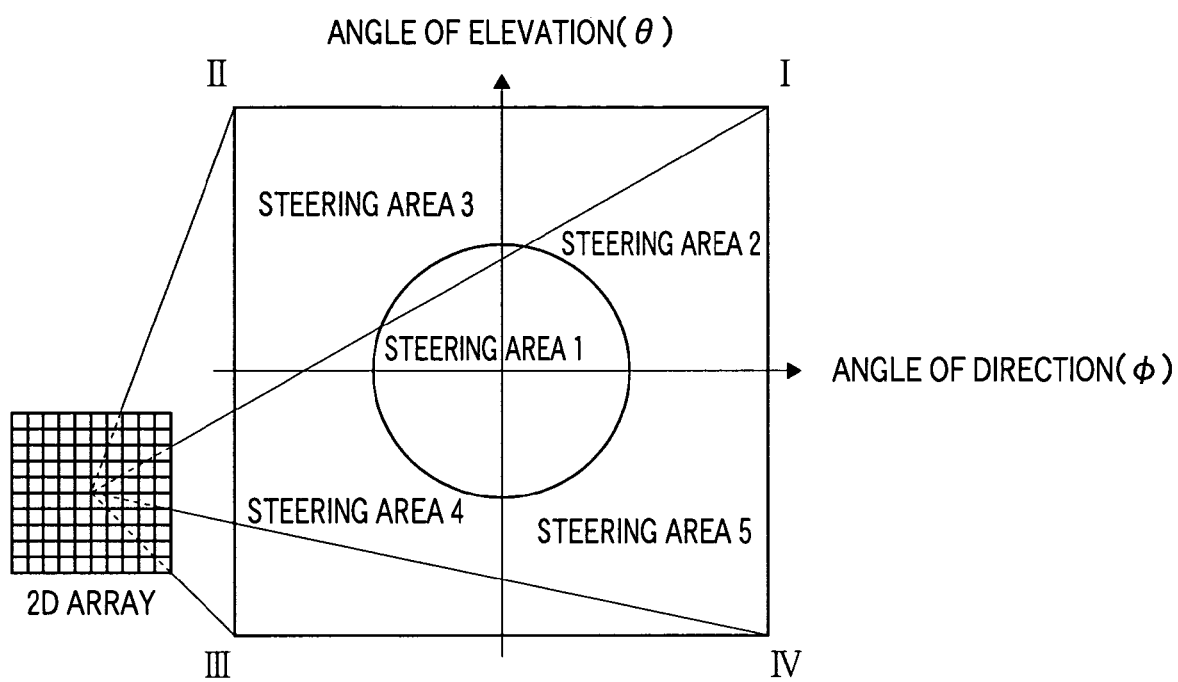
FIG. 7 is a diagram showing plural steering areas formed within a scan range to which the ultrasonic beam is transmitted from an ultrasonic transmitting and receiving apparatus according to one embodiment of the present invention.

FIG. 7 is a diagram showing plural steering areas formed within a scan range to which ultrasonic beam is transmitted from the ultrasonic transmitting and receiving apparatus according to one embodiment of the present invention. As shown in FIG. 7, the scan range is divided into steering areas 1–5. The steering area 1 is an area encircled by a circle at the central portion of the scan range. The steering areas 2–5 are formed by dividing the scan range excluding the steering area 1 into first quadrant I to fourth quadrant IV, respectively.

From the results shown in FIGS. 5A–6B, ultrasonic transducers, which are used for actual transmission and reception of ultrasonic waves, are disposed according to the sparse pattern 1 in the steering area 1, and disposed according to the sparse pattern 2 in the steering area 2. Further, taking symmetric property of the steering areas 2–5 into consideration, in the steering area 3, the ultrasonic transducers are disposed according to a sparse pattern in which the sparse pattern 2 is rotated by 90° counterclockwise; in the steering area 4, the ultrasonic transducers are disposed according to a sparse pattern in which the sparse pattern 2 is rotated by 180°; and in the steering area 5, the ultrasonic transducers are disposed according to a sparse pattern, in which the sparse pattern 2 is rotated by 270° counterclockwise.

In the steering areas 1–5, by transmitting and receiving ultrasonic waves using a predetermined number of ultrasonic transducers disposed as described above, it is possible to reduce the influence of the side lobes to a low level in the entire scan range.

Referring to FIG. 1 again, the control unit 27 changes the connection between (i) the transducer array 11 and (ii) the transmitting circuits 21 and the receiving circuits 22 by controlling the multiplexers 14 through the controller 16 in accordance with each of the plural steering areas set within the scan range. Thereby, the arrangement of the ultrasonic transducers, which transmit and receive ultrasonic waves, is changed for each of the plural steering areas.

To the control unit 27, the flash memory 28 is connected. The flash memory 28 is storing means for storing arrangement information on the ultrasonic transducers for each of the plural steering areas as an instruction table in correspondence with the respective steering area.

FIG. 8 shows an example of the instruction table stored in the flash memory 28. In the flash memory 28, tables for the steering area 1 through 5, which represent arrangement information on the ultrasonic transducers to be connected to the transmitting circuit 21 and the receiving circuit 22, are stored in correspondence with each of the steering areas 1–5. In the respective tables, the ultrasonic transducers to be used are indicated by positions in the X-Y coordinate system of the ultrasonic transducers, which are disposed into a two-dimensional matrix-like configuration. For example, the coordinate (0, 1) at the left side in the table 1 indicates an ultrasonic transducer at a position (0, 1) in the X-Y coordinate system in the ultrasonic transducers disposed into the two-dimensional matrix-like configuration shown in FIG. 1. Also, the coordinate (Tx, Rx) at the right side in each table in FIG. 8 indicates the transmitting circuit 21 and the receiving circuit 22 to be connected to the ultrasonic transducer to be used.

Accordingly, for example, information which represents that (0, 1) corresponds to (Tx2, Rx3) in the table 1 means that an ultrasonic transducer positioned at (0, 1) in the X-Y coordinate system is connected to a transmitting circuit Tx2 and a receiving circuit Rx3. The information stored in the flash memory 28 can be rewritten. For example, it is possible for an operator to arbitrarily change the arrangement of the ultrasonic transducers afterward depending on the region to be observed.

Here, referring to FIG. 3B again, when the sparse pattern 2 shown in FIG. 3B is rotated by 90°, 180° or 270° in correspondence with the steering areas 2–5 shown in FIG. 7, the central area of the pattern changes little in the element arrangement thereof. Also, the element arrangement in the second quadrant and that in the fourth quadrant of the sparse pattern 2 shown in FIG. 3B have a high symmetric property with respect to the diagonal line connecting the right-upper and the left-lower of the figure. Therefore, as shown in FIG. 4, when classifying the sparse pattern 2 into arrangement patterns $P_A$–$P_D$, arrangement pattern $P_A$ can be fixed, and as for arrangement patterns $P_B$–$P_D$, it is understood that each arrangement pattern can be replaced as a unit with each other in correspondence with the steering area.

By arranging as described above, it is possible to largely reduce the number of circuits or wirings in the programmable switching device 13 in FIG. 1. Particularly, since the arrangement pattern $P_A$ can be fixed, as for the ultrasonic transducers included in this area, switching is not required to perform. Additionally, as for the instruction table for storing the arrangement information on the ultrasonic transducers and a delay table for storing delay time corresponding to these ultrasonic transducers, since they are required to be prepared just in correspondence with the arrangement patterns, it is possible to save the memory capacity of the flash memory which stores these tables.

Figure 9:
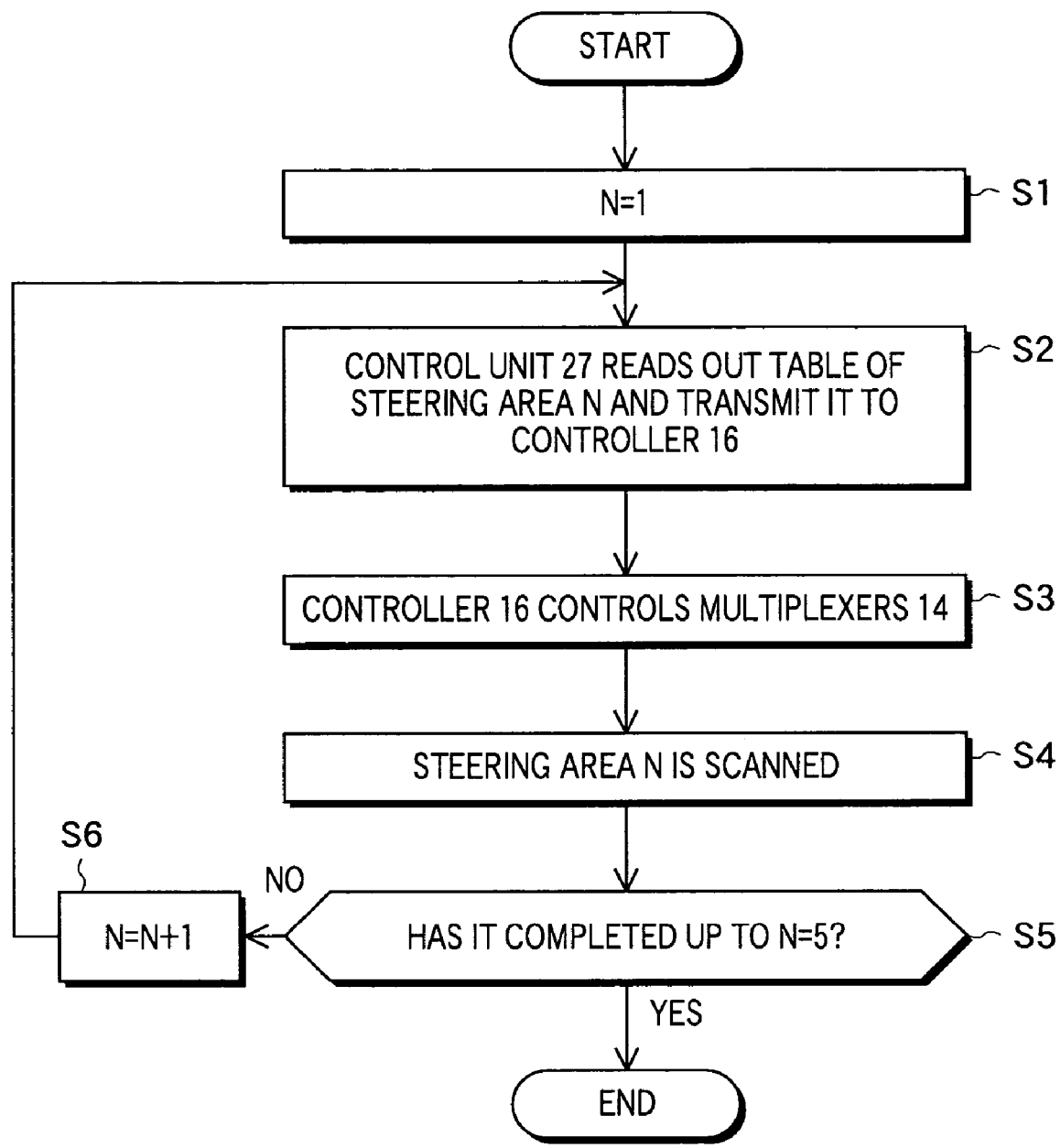
FIG. 9 is a flowchart showing operation of an ultrasonic transmitting and receiving apparatus according to one embodiment of the present invention.

Next, referring to FIGS. 1 and 9, the operation of the ultrasonic transmitting and receiving apparatus according to the embodiment will be described. FIG. 9 is a flowchart showing the operation of the ultrasonic transmitting and receiving apparatus according to the embodiment. Here, symbol N represents a steering area number.

First, at step S1, the value of N is initialized to 1, and the scanning starts from the steering area 1. At step S2, the control unit 27 reads out an instruction table corresponding to the steering area 1 from the flash memory 28 and transmit it to the controller 16. At step S3, the controller 16, which has received the instruction table from the control unit 27, controls the multiplexers 14 in accordance with the instruction table to set the connection between (i) a predetermined number of ultrasonic transducers and (ii) the transmitting circuit 21 and the receiving circuit 22.

At step S4, the ultrasonic transducers, which are connected to the transmitting circuit 21 and the receiving circuit 22, transmit ultrasonic waves to the steering area N to perform the scanning in the steering area N. At step S5, it is determined whether or not the value of N has reached 5. When the value of N is smaller than 5, the operation proceeds to step S6, and the value of N is incremented. Thus, when the scanning from the steering area 1 to the steering area 5 is performed in order, the scanning of the entire scan range is completed.

According to the embodiment, each ultrasonic transducer performs both of the transmission and reception of ultrasonic waves. However, it may be arranged so that, by separately providing ultrasonic transducers for transmission and ultrasonic transducers for reception, each ultrasonic transducer performs either one of transmission and reception of the ultrasonic waves. Also, although the programmable switching device is disposed in the ultrasonic probe, the programmable switching device may be disposed in the ultrasonic transmitting and receiving apparatus main body.

As described above, according to the present invention, since the sparse pattern of the ultrasonic transducers, which transmit and/or receive the ultrasonic wave, can be changed in accordance with the steering direction or range of the ultrasonic beam to be transmitted, it is possible to reduce the generation of side lobes in a specific direction and to obtain images of satisfactory quality even when performing sector scan of an area having a wide range.

Also, by applying the present invention to a multi-beam system in which ultrasonic beams are transmitted or received simultaneously in plural directions, it is possible to reduce the influence of the side lobes which are increased by multi-beam transmission. Further, in the case where one or more transmitting element and plural receiving elements are provided separately, and the transmitting element is disposed in the central area of the opening of an ultrasonic probe to transmit a thick ultrasonic beam and the plural receiving elements are disposed in the entire area of the opening of the ultrasonic probe to thereby receive the ultrasonic echo in a dispersive manner, it is also possible to change the sparse pattern of the transmitting, element or receiving elements in accordance with the steering direction or range of the ultrasonic beam so as to reduce the influence of the side lobes.

The invention claimed is:

1. An ultrasonic transmitting and receiving apparatus comprising:
   an ultrasonic probe including plural ultrasonic transducers arranged in a two-dimensional array;
   plural transmitting circuits for respectively generating plural drive signals to be supplied to said ultrasonic probe so as to transmit an ultrasonic beam;
   plural receiving circuits for respectively processing plural detection signals output from said ultrasonic probe which has received an ultrasonic echo;
   switching means for changing electrical connection between (i) a predetermined number of ultrasonic transducers included in said plural ultrasonic transducers and (ii) a predetermined number of transmitting circuits included in said plural transmitting circuits and/or a predetermined number of receiving circuits included in said plural receiving circuits; and
   control means for controlling said switching means to partially change a sparse pattern of the ultrasonic transducers, which transmit and/or receive ultrasonic waves, in accordance with a steering direction of the ultrasonic beam to be transmitted.

2. An ultrasonic transmitting and receiving apparatus according to claim 1, further comprising:
   rewritable storing means for storing information representing plural sparse patterns of the ultrasonic transducers, which transmit and/or receive ultrasonic waves, in accordance with a steering direction of the ultrasonic beam to be transmitted.

3. An ultrasonic transmitting and receiving apparatus according to claim 2, wherein said switching means is disposed in an ultrasonic transmitting and receiving apparatus main body.

4. An ultrasonic transmitting and receiving apparatus according to claim 1, wherein said switching means is disposed in an ultrasonic transmitting and receiving apparatus main body.

5. An ultrasonic transmitting and receiving method comprising the steps of:
   (a) changing electrical connection between (i) a predetermined number of ultrasonic transducers included in plural ultrasonic transducers arranged in a two-dimensional array and (ii) a predetermined number of transmitting circuits included in plural transmitting circuits and/or a predetermined number of receiving circuits included in plural receiving circuits to partially change a sparse pattern of the ultrasonic transducers, which transmit and/or receive ultrasonic waves, in accordance with a steering direction of an ultrasonic beam to be transmitted; and
   (b) transmitting an ultrasonic beam and/or receiving an ultrasonic echo in accordance with the sparse pattern changed at step (a).

* * * * *